(12) United States Patent
Ogawa

(10) Patent No.: US 12,722,212 B2
(45) Date of Patent: Sep. 1, 2026

(54) DRILL AND METHOD FOR MANUFACTURING MACHINED PRODUCT

(71) Applicant: KYOCERA CORPORATION, Kyoto (JP)

(72) Inventor: Hiroshi Ogawa, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 894 days.

(21) Appl. No.: 17/998,041

(22) PCT Filed: May 10, 2021

(86) PCT No.: PCT/JP2021/017620

§ 371 (c)(1),
(2) Date: Nov. 7, 2022

(87) PCT Pub. No.: WO2021/230176

PCT Pub. Date: Nov. 18, 2021

(65) Prior Publication Data

US 2023/0173594 A1 Jun. 8, 2023

(30) Foreign Application Priority Data

May 11, 2020 (JP) ................................ 2020-082959

(51) Int. Cl.
*B23B 51/02* (2006.01)

(52) U.S. Cl.
CPC ........ *B23B 51/02* (2013.01); *B23B 2251/048* (2022.01); *B23B 2251/14* (2013.01); *B23B 2251/202* (2013.01)

(58) Field of Classification Search
CPC .............. B23B 51/02; B23B 2251/048; B23B 2251/14
See application file for complete search history.

(56) References Cited

U.S. PATENT DOCUMENTS 5,236,291 A * 8/1993 Agapiou ................ B23B 51/02 408/230
10,981,235 B2 * 4/2021 Tsukihara ................ B23C 5/10
2017/0274461 A1 9/2017 Mabuchi et al.

FOREIGN PATENT DOCUMENTS

CN 106660141 A 5/2017
DE 102009035625 A1 * 2/2011 ............ B23B 51/00
JP 02292109 A * 12/1990
JP 2010125592 A 6/2010

(Continued)

*Primary Examiner* — Eric A. Gates
(74) *Attorney, Agent, or Firm* — HAUPTMAN HAM, LLP

(57) ABSTRACT

A drill has a body with an outer peripheral surface, a cutting edge located on a first end, a flank surface located along the cutting edge on a rear side in a rotation direction of a rotation axis, and a flute extending from the cutting edge toward a second end. The cutting edge has a first cutting edge, a second cutting edge extending from the first cutting edge toward the outer peripheral surface, and a third cutting edge extending from the second cutting edge toward the outer peripheral surface. A flank surface has a first flank surface located along the first cutting edge with a first clearance angle, a second flank surface located along the second cutting edge with a second clearance angle, and a third flank surface located along the third cutting edge with a third clearance angle. The second clearance angle is smaller than the first and third clearance angles.

14 Claims, 11 Drawing Sheets

(56) References Cited

FOREIGN PATENT DOCUMENTS

| | | | | | |
|---|---|---|---|---|---|
| JP | 2014161946 | A | * | 9/2014 | |
| KR | 101000863 | B1 | * | 12/2010 | ............. B23B 51/02 |
| WO | WO-2004013450 | A1 | * | 2/2004 | ............. E21B 10/58 |
| WO | 2010086988 | A1 | | 8/2010 | |

* cited by examiner

DRILL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/017620 filed on May 10, 2021, which claims priority to Japanese Patent Application No. 2020-082959, filed on May 11, 2020, which is entirely incorporated herein by reference in their entirety.

TECHNICAL FIELD

The present disclosure generally relates to a drill which is used in a drilling process of a workpiece, and a method for manufacturing a machined product. Examples of the drill may have indexable drills and solid drills.

BACKGROUND

For example, drills discussed in Japanese Unexamined Patent Publication No. 2010-125592 (Patent Document 1) and WO 2010/086988 (Patent Document 2) have been known as a drill used in a drilling process of a workpiece, such as metal. The drill discussed in Patent Document 1 has a cutting edge and a chamfer end cutting edge located on an outer peripheral side relative to the cutting edge. The drill discussed in Patent Document 2 has a first cutting edge and a second cutting edge located on an outer peripheral side relative to the first cutting edge.

There is a desire for enhanced precision of a machined hole in a drilling process using the drill.

SUMMARY

A drill in a non-limiting aspect of the present disclosure has a body extended along a rotation axis from a first end toward a second end. The body has an outer peripheral surface, a cutting edge located on a side of the first end, a flank surface located along the cutting edge on a rear side in a rotation direction of the rotation axis, and a flute extended from the cutting edge toward the second end. The cutting edge has a first cutting edge, a second cutting edge extended from the first cutting edge toward the outer peripheral surface, and a third cutting edge extended from the second cutting edge toward the outer peripheral surface. The flank surface has a first flank surface which is located along the first cutting edge and has a first clearance angle, a second flank surface which is located along the second cutting edge and has a second clearance angle, and a third flank surface which is located along the third cutting edge and has a third clearance angle. The second clearance angle is smaller than each of the first clearance angle and the third clearance angle.

EMBODIMENTS

Drills

Figure 1:
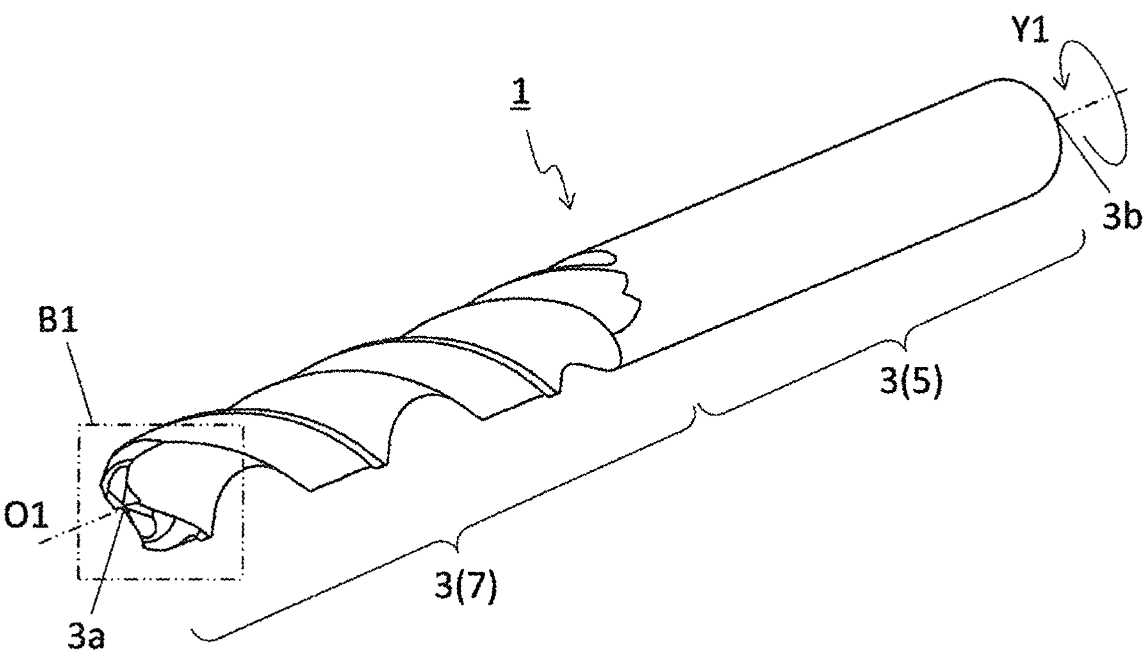
FIG. 1 is a perspective view illustrating a drill in a non-limiting embodiment of the present disclosure.

A drill 1 in a non-limiting embodiment of the present disclosure is described in detail below with reference to the drawings. For convenience of description, each of the drawings referred to in the following illustrates, in simplified form, only main members necessary for describing embodiments. The drill 1 may therefore have any arbitrary structural member not illustrated in the drawings referred to. Dimensions of the members in each of the drawings faithfully represent neither dimensions of actual structural members nor dimensional ratios of these members.

The non-limiting embodiment may illustrate a solid drill as an example of the drill 1. The drill 1 is, however, not limited to the solid drill, but may be, for example, an indexable drill.

The drill 1 may have a body 3 as in the non-limiting embodiment illustrated in FIGS. 1 to 4. The body 3 may extend along a rotation axis O1 from a first end 3*a* toward a second end 3*b*. In other words, the body 3 may have a bar shape extending along the rotation axis O1 from the first end 3*a* to the second end 3*b*. In general, the first end 3*a* is called "a front end" and the second end 3*b* is called "a rear end." The body 3 is rotatable around the rotation axis O1. An arrow Y1 in FIG. 1 and the like indicates a rotation direction of the rotation axis O1.

The body 3 may have a shank part 5 and a cutting part 7. The shank part 5 can be held by a rotating spindle of a machine tool. The shank part 5 may be designed according to a shape of the spindle in the tool machine.

The cutting part 7 may be located on a side of the first end 3*a* relative to the shank part 5. The cutting part 7 is contactable with a workpiece and servable as a major role in a cutting process (for example, a drilling process) of the workpiece.

An outer diameter D of the cutting part 7 is not limited to a specific value. For example, a maximum value of the outer diameter D may be set to 2-50 mm. A length L of the cutting part 7 in a direction along the rotation axis O1 may be set to L=1.5 D to L=12 D.

Figure 5:
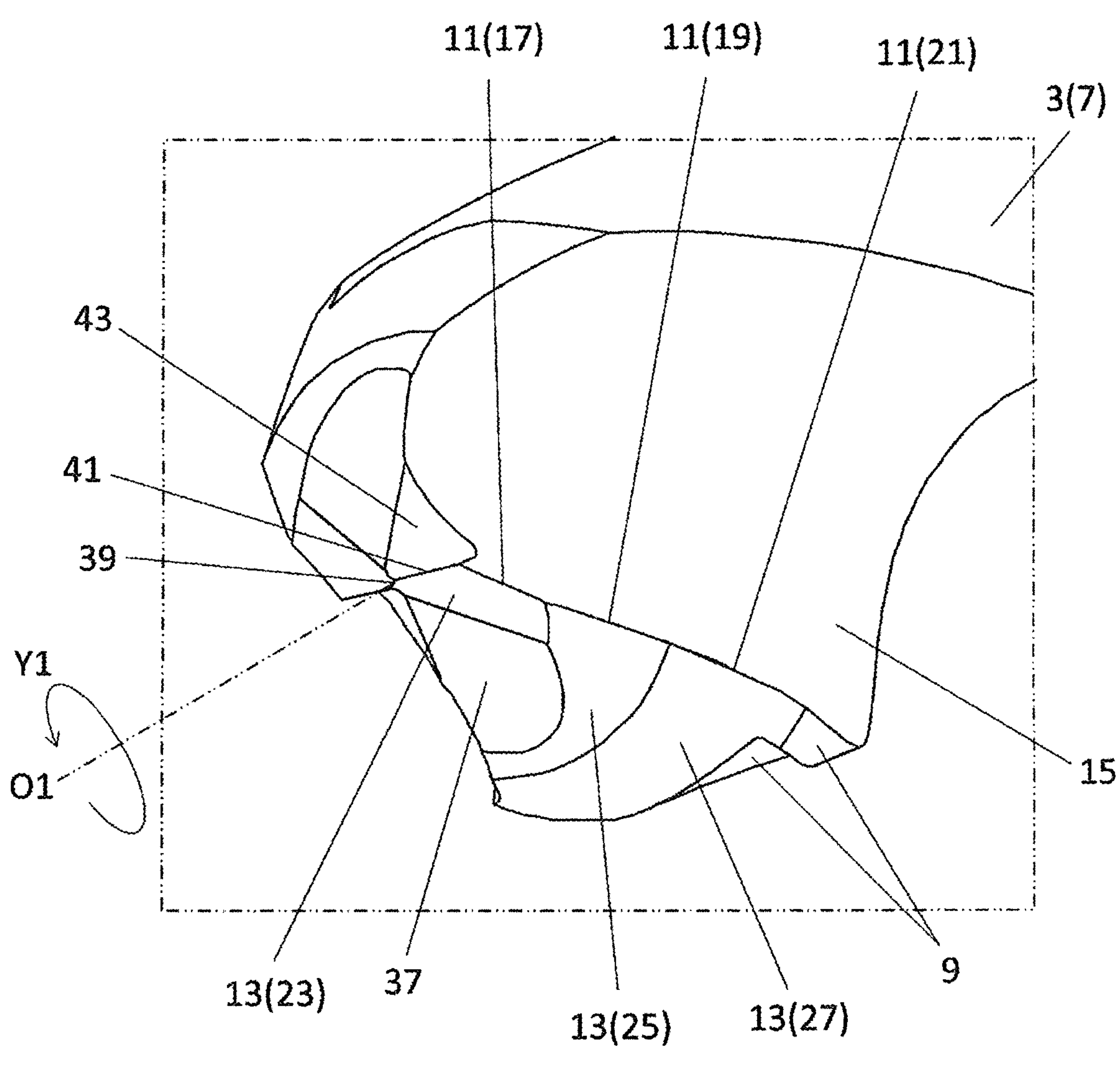
FIG. 5 is an enlarged view of a region B1 illustrated in FIG. 1.

The body 3 may have an outer peripheral surface 9, a cutting edge 11, a flank surface 13 and a flute 15 as in a non-limiting embodiment illustrated in FIG. 5. The cutting edge 11 may be located on a side of the first end 3*a*. The flank surface 13 may be located along the cutting edge 11 on a rear side in the rotation direction Y1 of the rotation axis O1. The flute 15 may extend from the cutting edge 11 toward the second end 3*b*. The outer peripheral surface 9, the cutting edge 11, the flank surface 13 and the flute 15 may be located in the cutting part 7.

Figure 6:
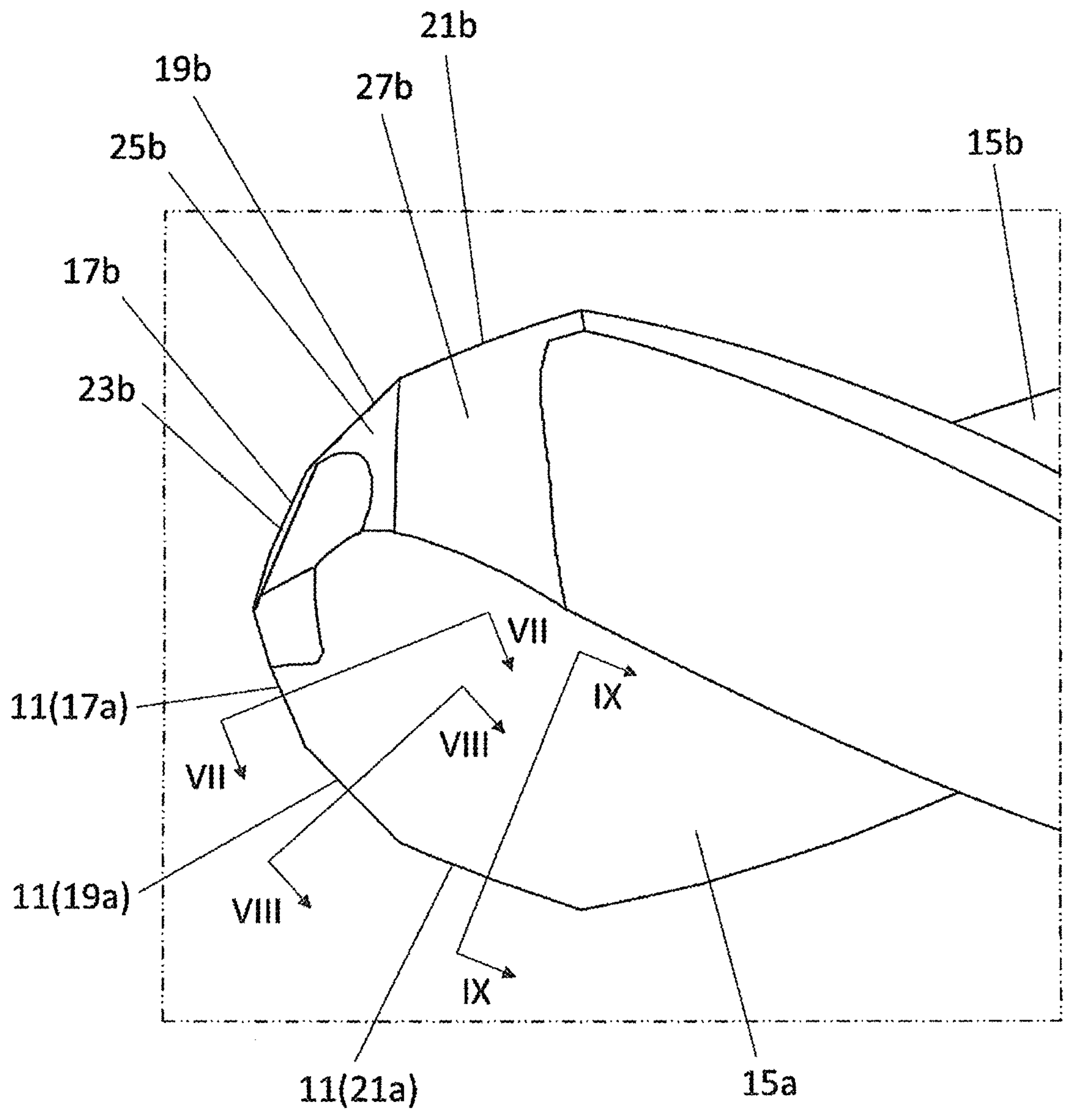
FIG. 6 is an enlarged view of a region B2 illustrated in FIG. 3.

The cutting edge 11 is usable for cutting out the workpiece in the cutting process. The cutting edge 11 may have a first cutting edge 17, a second cutting edge 19 and a third cutting edge 21. The first cutting edge 17, the second cutting edge 19 and the third cutting edge 21 are also called a major cutting edge. The second cutting edge 19 may extend from the first cutting edge 17 toward the outer peripheral surface 9. The third cutting edge 21 may extend from the second cutting edge 19 toward the outer peripheral surface 9. The first cutting edge 17 may be located away from the rotation axis O1. As in a non-limiting embodiment illustrated in FIGS. 3 and 6, the second cutting edge 19 may be inclined relative to the first cutting edge 17, and the third cutting edge 21 may be inclined relative to the second cutting edge 19 as viewed from a direction orthogonal to the rotation axis O1. The third cutting edge 21 may connect to the outer peripheral surface 9.

The number of the first cutting edge 17 may be one or a plural number. If the number of the first cutting edge 17 is the plural number, the number thereof may be 2 to 5. These points are also true for the second cutting edge 19 and the third cutting edge 21. The drill 1 may be a so-called 2-cutting edge drill as in the non-limiting embodiment illustrated in FIG. 2.

In cases where the number of the first cutting edge 17 is the plural number, the plurality of first cutting edges 17 may be located so as to have rotational symmetry relative to the rotation axis O1 in a front view from a side of the first end 3*a*. Specifically, if the number of the first cutting edges 17 is two as in the non-limiting embodiment illustrated in FIG. 2, the two first cutting edges 17 may be located so as to have 180° rotational symmetry relative to the rotation axis O1 in the front view from the side of the first end 3*a*. This leads to enhanced straight-line stability of the drill 1 when cutting out the workpiece. These points are also true for the second cutting edge 19 and the third cutting edge 21.

The first cutting edge 17 may have a straight line shape or curvilinear shape in the front view from the side of the first end 3*a*, or alternatively, may have a combined shape made up of a straight line shape and a curvilinear shape. These points are also true for the second cutting edge 19 and the third cutting edge 21.

The first cutting edge 17, the second cutting edge 19 and the third cutting edge 21 may have the same or different shapes in the front view from the side of the first end 3*a*. For example, the first cutting edge 17 may have a concave curvilinear shape in the front view from the side of the first end 3*a* as in the non-limiting embodiment illustrated in FIG. 2. The second cutting edge 19 may have a straight line shape. The third cutting edge 21 may have a convex curvilinear shape.

The first cutting edge 17, the second cutting edge 19 and the third cutting edge 21 may have the same or different lengths. For example, the second cutting edge 19 may have a larger length than the first cutting edge 17 as in the non-limiting embodiment illustrated in FIG. 2. The third cutting edge 21 may have a larger length than the second cutting edge 19. The third cutting edge 21 may have the largest length in the cutting edge 11.

The flute 15 is usable for discharging chips generated by the cutting edge 11 to the outside. The flute 15 may extend in parallel to the rotation axis O1, or may extend spirally around the rotation axis O1. The number of the flute 15 may be one or a plural number.

The flute 15 may connect to the cutting edge 11. This leads to enhanced biting property against a workpiece. Alternatively, a rake surface that connects both the flute 15 and the cutting edge 11 may be located therebetween. With this configuration, a discharge direction of chips generated by the cutting edge 11 tends to become stable. From the viewpoint of smoothly discharging the chips to the outside, the flute 15 may have a concave curvilinear shape in a cross section orthogonal to the rotation axis O1.

A depth of the flute 15 is not limited to a specific value. For example, the depth of the flute 15 may be set to 10-40% of an outer diameter of the body 3 (cutting part 7). As used herein, the term "depth" of the flute 15 may be a value obtained by subtracting a distance between a bottom of the flute 15 and the rotation axis O1 from a radius of the body 3 (cutting part 7) in the cross section orthogonal to the rotation axis O1. As used herein, the term "bottom" may be a part closest to the rotation axis O1 in the flute 15.

The flank surface 13 may have a first flank surface 23, a second flank surface 25 and a third flank surface 27. The first flank surface 23 may be located along the first cutting edge 17. The second flank surface 25 may be located along the second cutting edge 19. The third flank surface 27 may be located along the third cutting edge 21.

The first flank surface 23 may connect to the first cutting edge 17, or may be located away from the first cutting edge 17. Similarly, the second flank surface 25 may connect to the second cutting edge 19, or may be located away from the second cutting edge 19. The third flank surface 27 may connect to the third cutting edge 21, or may be located away from the third cutting edge 21. For example, as in the non-limiting embodiment illustrated in FIG. 2, the first flank surface 23 may connect to the first cutting edge 17, and the second flank surface 25 may connect to the second cutting edge 19, and the third flank surface 27 may connect to the third cutting edge 21.

The flank surface 13 may have a "clearance angle." As used herein, the term "clearance angle" may be prescribed as follows. Firstly, a cross section orthogonal to the cutting edge 11 may be illustrated in a target part in the cutting edge 11. For example, cross sections respectively orthogonal to the first cutting edge 17, the second cutting edge 19 and the third cutting edge 21 may be illustrated as in a non-limiting embodiment illustrated in FIGS. 6 to 9. If the drill 1 is the so-called 2-cutting edge drill, the drill 1 may have two each of the components, such as the first cutting edge 17. In order to facilitate visual understanding of a positional relationship among the individual components, alphabet "a" is added to a reference numeral indicating one of components, and alphabet "b" is added to the reference numeral denoting the other of the components in FIGS. 6 to 9. For example, one of the first cutting edges 17 is identified by alphanumeric characters 17*a*, and the other is identified by alphanumeric characters 17*b* in FIGS. 6 and 7.

An imaginary straight line that passes through the cutting edge 11 and is in contact with a rotational track of the cutting edge 11 in the above cross section may be a reference line L1. In cases where the cutting edge 11 is subjected to a chamfering process or honing process and the cutting edge 11 is a flat surface or convex curved surface as viewed microscopically, an imaginary straight line that passes through an end portion on a side of the flank surface 13 in the cutting edge 11 and is in contact with a rotational track of the end portion may be the reference line L1. An imaginary straight line in contact with an end portion on a side of the cutting edge 11 in the flank surface 13 may be an evaluation line L2. An angle formed by an intersection of the reference line L1 and the evaluation line L2 may be an "clearance angle."

Figure 7:
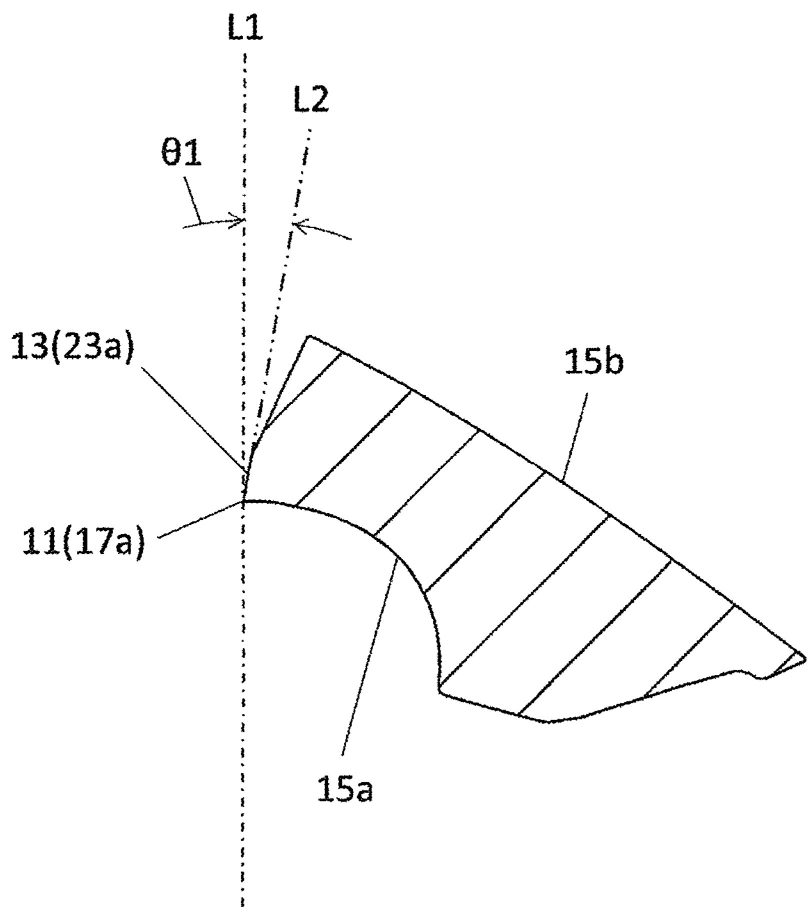
FIG. 7 is a cross-sectional view taken along the line VII-VII illustrated in FIG. 6.
Figure 8:
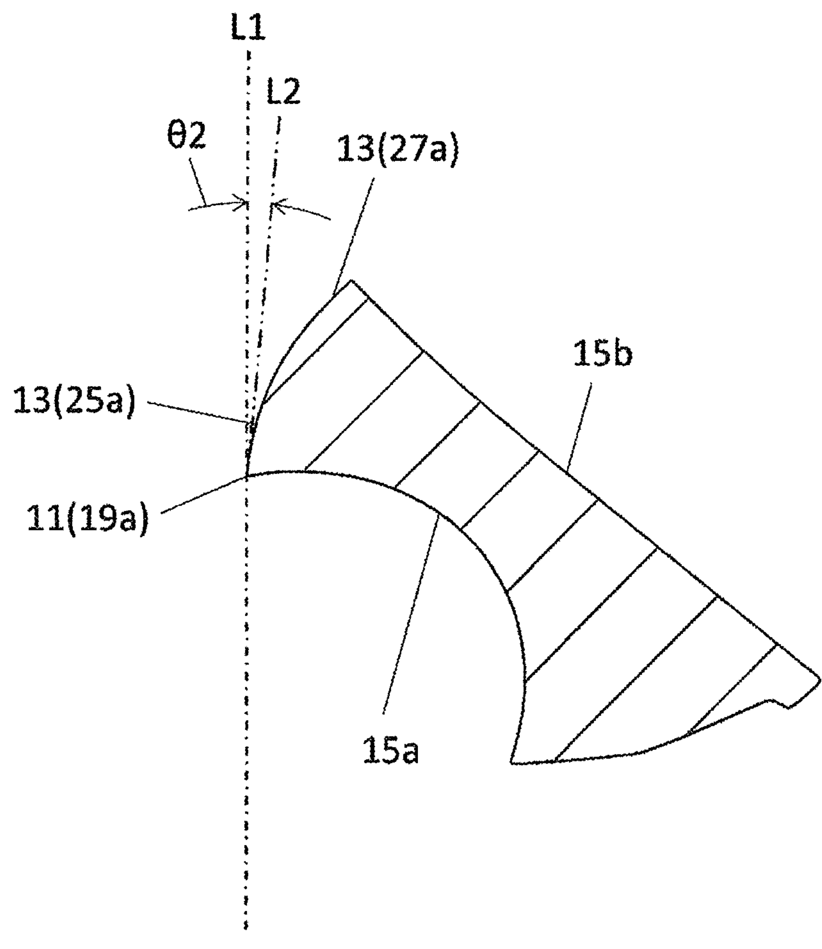
FIG. 8 is a cross-sectional view taken along the line VIII-VIII illustrated in FIG. 6.
Figure 9:
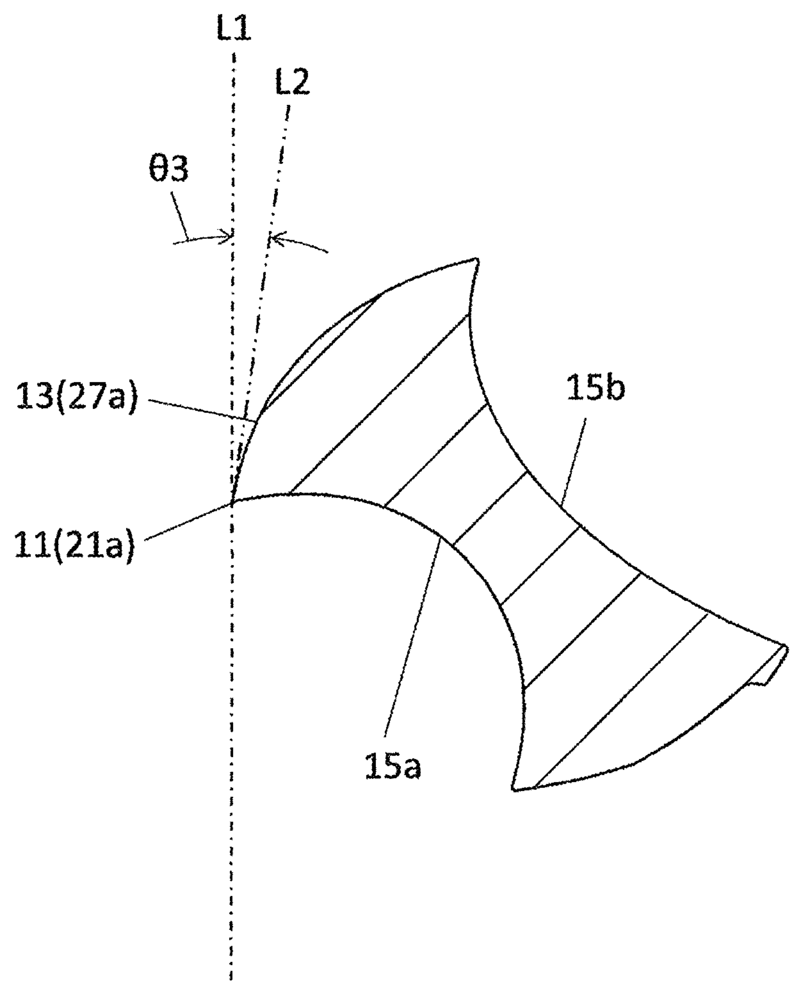
FIG. 9 is a cross-sectional view taken along the line IX-IX illustrated in FIG. 6.

The first flank surface 23 may have a first clearance angle θ1 as in a non-limiting embodiment illustrated in FIG. 7. The second flank surface 25 may have a second clearance angle θ2 as in a non-limiting embodiment illustrated in FIG. 8. The third flank surface 27 may have a third clearance angle θ3 as in a non-limiting embodiment illustrated in FIG. 9.

The second clearance angle θ2 may be smaller than each of the first clearance angle θ1 and the third clearance angle θ3. If the first clearance angle θ1 is relatively large, the first cutting edge 17 relatively close to the rotation axis O1 can have a sharp edge, and therefore, cutting resistance tends to be reduced, thus leading to enhanced straight-line stability of the drill 1. If the third clearance angle θ3 is relatively large, the third cutting edge 21 relatively close to the outer peripheral surface 9 can have a sharp edge, and therefore, burr is less likely to occur in a machined hole. If the second clearance angle θ2 is relatively small, it is easy to control movement of the drill 1 in a direction along the rotation axis O1. That is, because thrust resistance changes rapidly as soon as the drill 1 penetrates a workpiece, it is difficult to control the movement of the drill 1 in the direction along the rotation axis O1. However, if the second clearance angle θ2 is relatively small, the second flank surface 25 tends to come into contact with the workpiece, thereby facilitating the control of the movement of the drill 1 in the direction along the rotation axis O1. Hence, a highly precise machined hole is obtainable if the second clearance angle θ2 is smaller than each of the first clearance angle θ1 and the third clearance angle θ3.

The first clearance angle θ1 may be the same as or different from the third clearance angle θ3. As in the non-limiting embodiment illustrated in FIGS. 7 and 9, the first clearance angle θ1 is larger than the third clearance angle θ3, the thrust resistance tends to efficiently decrease at a front end portion subjected to a large depth of cut per revolution. This ensures high straight-line stability even against, for example, a workpiece subjected to a large cutting resistance.

If the first clearance angle θ1 is smaller than the third clearance angle θ3, the third flank surface 27 located on an outer peripheral side is less likely to come into contact with the workpiece than the first flank surface 23 located close to the rotation axis O1. That is, even if the flank surface comes into contact with the workpiece, the first flank surface 23 located closer to the rotation axis O1 than the third flank surface 27 is more likely to come into contact with the workpiece. Consequently, even if chatter vibration occurs due to the flank surface coming into contact with the workpiece, it is easy to reduce the chatter vibration.

The first clearance angle θ1, the second clearance angle θ2 and the third clearance angle θ3 are not limited to a specific value. For example, the first clearance angle θ1 may be set to 5-15°. The second clearance angle θ2 may be set to 5° or less. The third clearance angle θ3 may be set to 5-20°.

The first flank surface 23 may be a flat surface, and the second flank surface 25 and the third flank surface 27 are individually curved surfaces. This facilitates control of the movement of the drill 1. If the first flank surface 23 is the flat surface, it is easy to keep a small point angle of the drill 1, thereby making it easier for the drill 1 to bite in the workpiece. Additionally, the drill 1 tends to vibrate, for example, when the drill 1 penetrates the workpiece in a cutting process. However, if the second flank surface 25 and the third flank surface 27 are the curved surfaces, the second flank surface 25 and the third flank surface 27 tend to come into contact with the workpiece when the drill 1 penetrates the workpiece. Accordingly, the vibration of the drill 1 can be reduced to facilitate maintaining the straight-line stability.

As used herein, the term "flat surface" may be an approximately flat surface, and there is no need to be a strict flat surface. This is also true of the curved surface. The second flank surface 25 and the third flank surface 27 may be individually convex curved surfaces.

Figure 2:
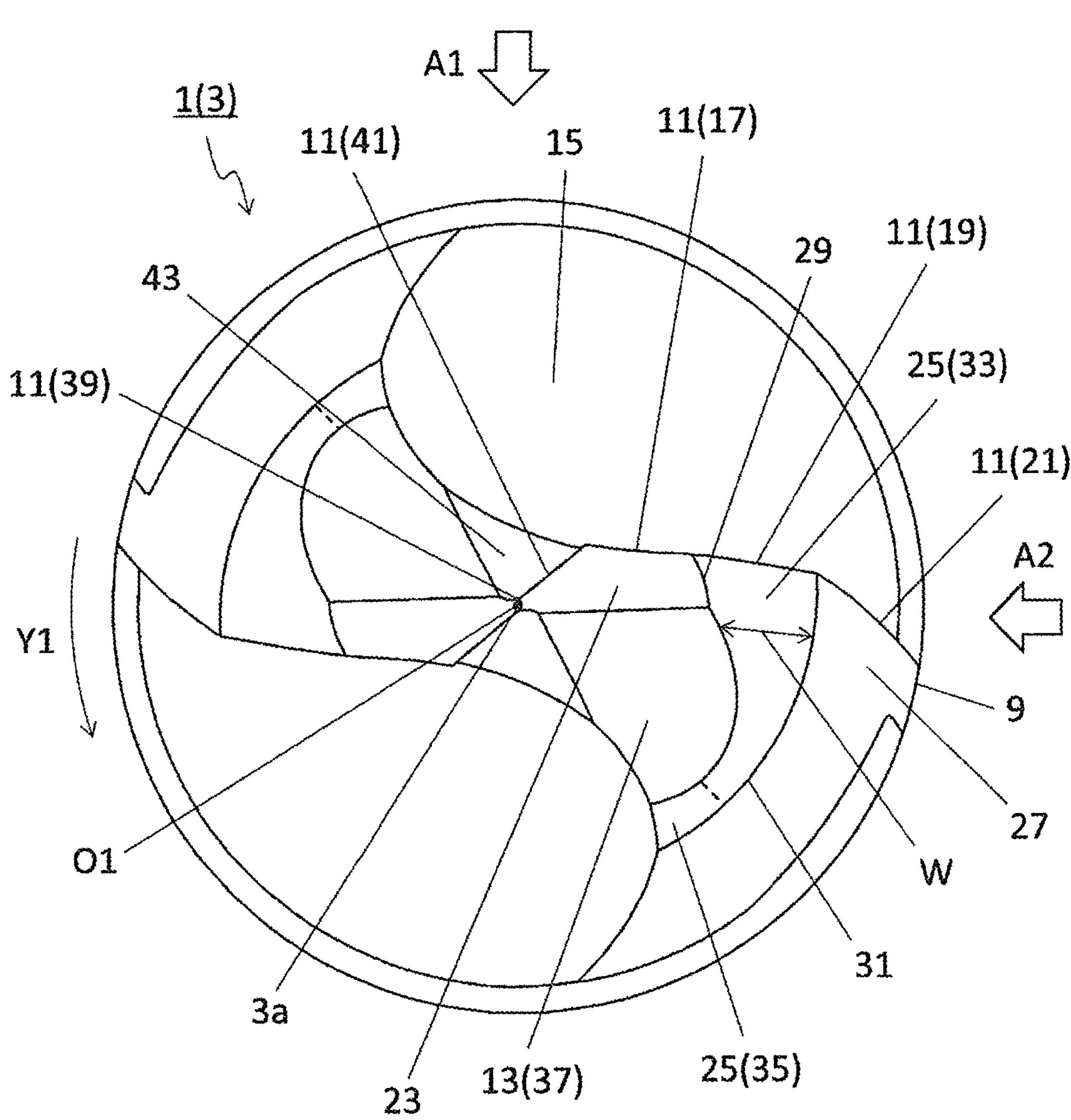
FIG. 2 is a plan view of the drill illustrated in FIG. 1 as viewed from a side of a first end.
Figure 3:
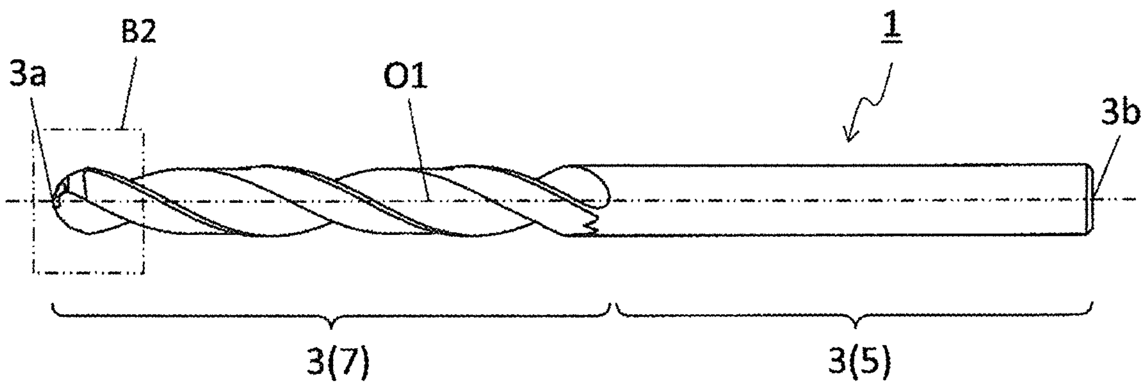
FIG. 3 is a side view of the drill illustrated in FIG. 2 as viewed from an A1 direction.
Figure 4:
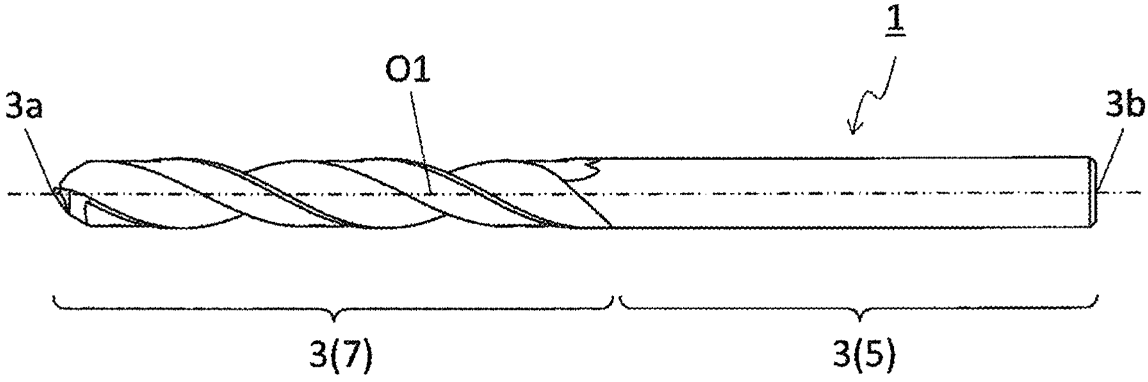
FIG. 4 is a side view of the drill illustrated in FIG. 2 as viewed from an A2 direction.

A boundary between the first flank surface 23 and the second flank surface 25 may be a first boundary 29 as in the non-limiting embodiment illustrated in FIG. 2. The first boundary 29 may be located closer to the outer peripheral surface 9 as going from the cutting edge 11 (the first cutting edge 17 and the second cutting edge 19) toward a rear side in the rotation direction Y1. With this configuration, it is easy to reduce the chatter vibration due to the flank surface coming into contact with the workpiece. This is because even if the flank surface comes into contact with the workpiece, the first flank surface 23 located closer to the rotation axis O1 than the second flank surface 25 is more likely to come into contact with the workpiece. It is therefore easy to reduce the chatter vibration while ensuring the length of the second cutting edge 19. The first boundary 29 may have a curvilinear shape.

A boundary between the second flank surface 25 and the third flank surface 27 may be a second boundary 31. The second boundary 31 may be located further away from the outer peripheral surface 9 as going from the cutting edge 11 (the second cutting edge 19 and the third cutting edge 21) toward the rear side in the rotation direction Y1. The second boundary 31 may have a curvilinear shape. A radius of curvature at the second boundary 31 having the curvilinear shape may be smaller than a radius of curvature at the first boundary 29 having the curvilinear shape.

In a front view from a side of the first end 3*a*, the second flank surface 25 may have a first region 33 whose width W in a radial direction of the rotation axis O1 decreases toward the rear side in the rotation direction Y1, and a second region 35 whose width W increases toward the rear side in the rotation direction Y1. The second region 35 is located on a more rear side in the rotation direction Y1 than the first region 33. This makes it possible to minimize influence of heat generated in the first region 33 when the second flank surface 25 comes into contact with the workpiece, so that the movement of the drill 1 can be controlled effectively. The second region 35 may connect to the first region 33.

A maximum value of the width W in the first region 33 may be the same as or different from a maximum value of the width W in the second region 35. As in the non-limiting embodiment illustrated in FIG. 2, if the maximum value of the width W in the first region 33 is larger than the maximum value of the width W in the second region 35, it is easy to reduce heat generated in the second region 35. This is because even if the second flank surface 25 comes into contact with the workpiece when the drill 1 penetrates the workpiece, it is possible to avoid the second region 35 from excessively coming into contact with the workpiece.

The second flank surface 25 may connect to the first flank surface 23. The third flank surface 27 may connect to the second flank surface 25, and may connect to the outer peripheral surface 9.

The first flank surface 23, the second flank surface 25 and the third flank surface 27 may have the same area or different areas. For example, as in the non-limiting embodiment illustrated in FIG. 2, the area of the second flank surface 25 may be larger than the area of the first flank surface 23. The area of the third flank surface 27 may be larger than the area of the second flank surface 25. The area of the third flank surface 27 may become the largest on the flank surface 13.

The flank surface 13 may further have a fourth flank surface 37 located along the first flank surface 23 on the rear side in the rotation direction Y1 and inclined relative to the first flank surface 23. The fourth flank surface 37 may also be called a third flank.

The fourth flank surface 37 may connect to the first flank surface 23, and may connect to the second flank surface 25. The fourth flank surface 37 may be a flat surface. An inclination angle of the fourth flank surface 37 is not limited to a specific value. The inclination angle of the fourth flank surface 37 may be set to, for example, 15-35°.

The cutting edge 11 may have a chisel edge 39. The chisel edge 39 can play a role in biting in a workpiece. The chisel edge 39 may be located closest to the rotation axis O1 in the cutting edge 11. The chisel edge 39 may intersect with the rotation axis O1. The chisel edge 39 may be located between the two first flank surfaces 23. The chisel edge 39 may be located at an intersection of the two first flank surfaces 23. The chisel edge 39 is the shortest in the cutting edge 11. The chisel edge 39 may have a straight line shape in a front view from a side of the first end 3*a*.

The cutting edge 11 may have a thinning edge 41. The thinning edge 41 may be located closer to the rotation axis O1 than the first cutting edge 17. The thinning edge 41 may be located between the first cutting edge 17 and the chisel edge 39. The thinning edge 41 may connect to the first cutting edge 17, and may connect to the chisel edge 39. A length of the thinning edge 41 may be smaller than a length of the first cutting edge 17. The thinning edge 41 may have a straight line shape in a front view from a side of the first end 3*a*.

The body 3 may have a gash 43 located between the thinning edge 41 and the flute 15. The gash 43 may be located along the thinning edge 41 on a front side in the rotation direction Y1.

Examples of material of the body 3 may include cemented carbide and cermet. Examples of composition of the cemented carbide include WC—Co, WC—TiC—Co and WC—TiC—TaC—Co. Here, WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). However, the above materials are non-limiting examples, and there is no intention to limit the material of the body 3 to these materials.

A surface of the body 3 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Method for Manufacturing Machined Product>

A method for manufacturing a machined product 101 in a non-limiting embodiment of the present disclosure is described below with reference to FIGS. 10 to 12.

The machined product 101 may be manufactured by carrying out a cutting process of a workpiece 103. The method for manufacturing the machined product 101 may have the following steps (1) to (4).

Figure 10:
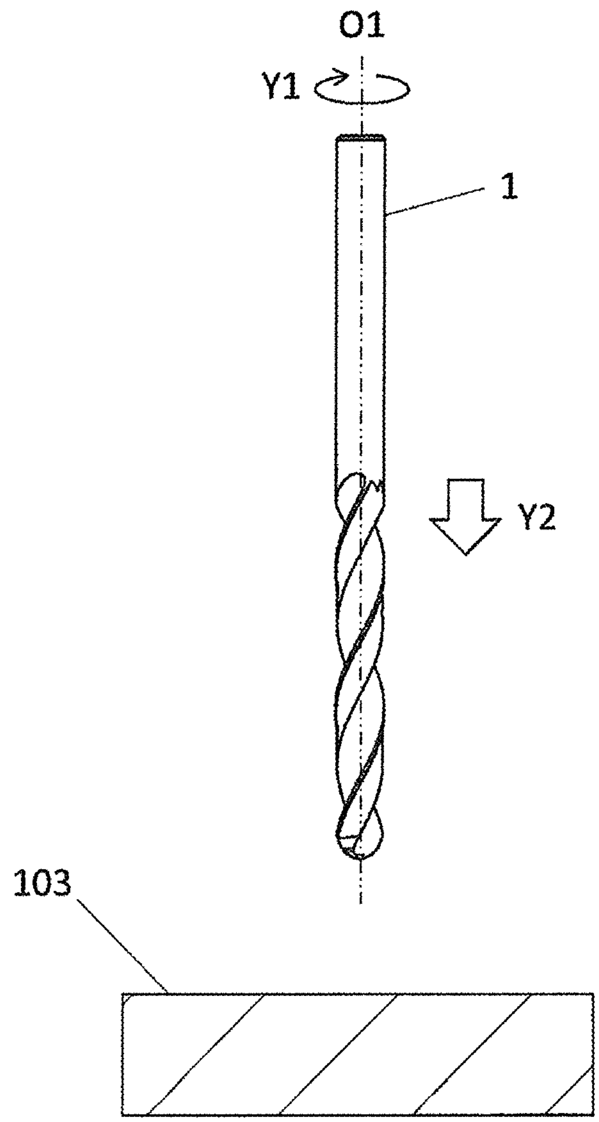
FIG. 10 is a schematic diagram illustrating one of the steps in a method for manufacturing a machined product in a non-limiting embodiment of the present disclosure.

(1) Putting the drill 1 above the prepared workpiece 103 (refer to FIG. 10).

(2) Rotating the drill 1 around the rotation axis O1 in a direction of an arrow Y1, and bringing the drill 1 near the workpiece 103 in a Y2 direction (refer to FIG. 10).

The above steps (1) and (2) may be carried out by, for example, fixing the workpiece 103 onto a table of a machine tool with the drill 1 attached thereto, and by bringing the drill 1 being rotated near the workpiece 103. In the step (2), the workpiece 103 and the drill 1 may be brought close to each other. For example, the workpiece 103 may be brought near the drill 1.

Figure 11:
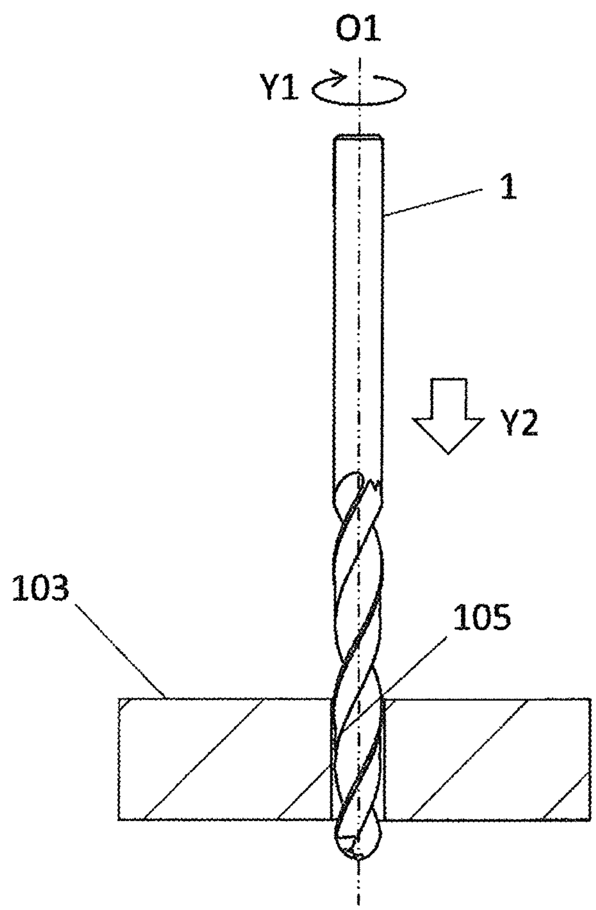
FIG. 11 is a schematic diagram illustrating one of the steps in the method for manufacturing the machined product in the non-limiting embodiment of the present disclosure.

(3) Forming a machined hole 105 in the workpiece 103 by bringing the drill 1 closer to the workpiece 103 so that the drill 1 being rotated can come into contact with a desired position on a surface of the workpiece 103 (refer to FIG. 11).

In the step (3), the cutting process may be carried out so that at least a part of the cutting part 7 in the body 3 can be located in the machined hole 105. In the step (3), setting may be made so that the shank part 5 in the body 3 can be located outside the machined hole 105. From the viewpoint of obtaining a good finished surface, setting may be made so that a part of the cutting part 7 which is located close to the second end 3*b* can be located outside the machined hole 105. The above part is servable as a margin region for discharging chips, thereby offering excellent chip discharge performance through the region.

Figure 12:
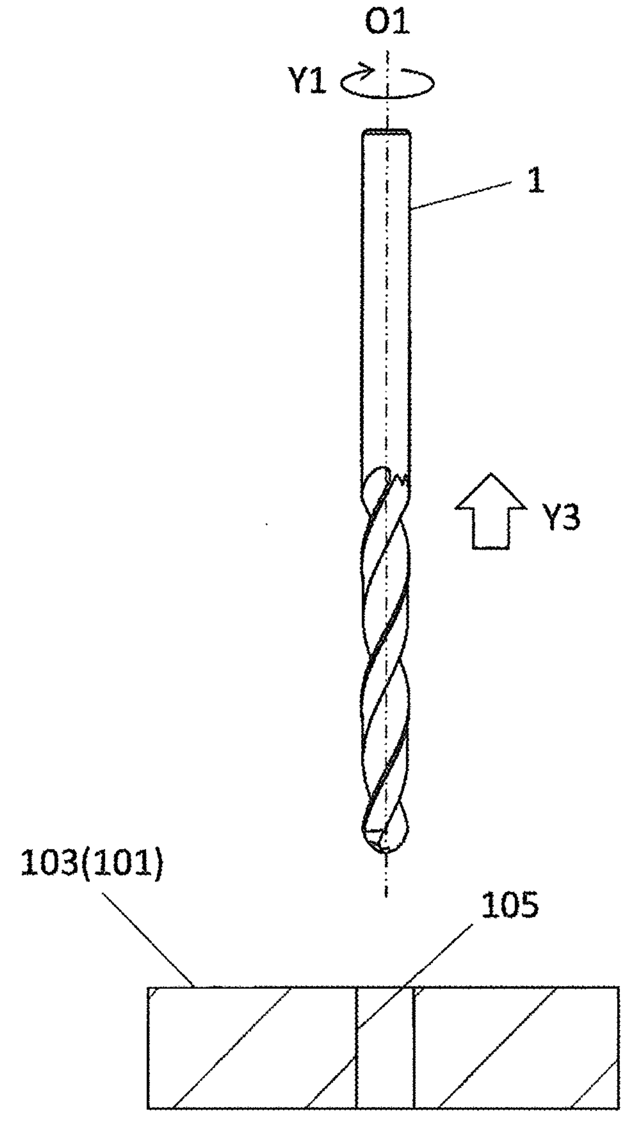
FIG. 12 is a schematic diagram illustrating one of the steps in the method for manufacturing the machined product in the non-limiting embodiment of the present disclosure.

(4) Moving the drill 1 away from the workpiece 103 in a Y3 direction (refer to FIG. 12).

Also in the step (4), similar to the step (2), the workpiece 103 and the drill 1 may be separated from each other. For example, the workpiece 103 may be moved away from the drill 1.

The machined product 101 having the highly precise machined hole 105 is obtainable if carrying out the above steps.

In cases where the above cutting process of the workpiece 103 is carried out a plurality of times and, for example, a plurality of machined holes 105 are formed in the single workpiece 103, the step of bringing the cutting edge 11 of the drill 1 into contact with different portions of the workpiece 103 may be repeated while keeping the drill 1 rotated.

Examples of material of the workpiece 103 may include aluminum, carbon steel, alloy steel, stainless steel, cast iron and nonferrous metals.

DESCRIPTION OF THE REFERENCE NUMERAL

1 drill
3 body
3*a* first end (front end)
3*b* second end (rear end)
5 shank part
7 cutting part
9 outer peripheral surface
11 cutting edge
13 flank surface
15 flute
17 first cutting edge
19 second cutting edge
21 third cutting edge
23 first flank surface
25 second flank surface

27 third flank surface
29 first boundary
31 second boundary
33 first region
35 second region
37 fourth flank surface
39 chisel edge
41 thinning edge
43 gash
101 machined product
103 workpiece
105 machined hole
O1 rotation axis
Y1 rotation direction
L1 reference line
L2 evaluation line
θ1 first clearance angle
θ2 second clearance angle
θ3 third clearance angle

The invention claimed is:

1. A drill, comprising:
a body extended along a rotation axis from a first end to a second end,
the body comprising
an outer peripheral surface,
a cutting edge located on a side of the first end,
a flank surface located along the cutting edge on a rear side in a rotation direction of the rotation axis, and
a flute extended from the cutting edge toward the second end, the cutting edge comprising
a first cutting edge,
a second cutting edge extended from the first cutting edge toward the outer peripheral surface and directly connected to the first cutting edge, and
a third cutting edge extended from the second cutting edge toward the outer peripheral surface,
the flank surface comprising
a first flank surface which is located along the first cutting edge and has a first clearance angle,
a second flank surface which is located along the second cutting edge and has a second clearance angle, and
a third flank surface which is located along the third cutting edge and has a third clearance angle,
the second clearance angle being smaller than each of the first clearance angle and the third clearance angle.

2. The drill according to claim 1, wherein the first clearance angle is larger than the third clearance angle.

3. The drill according to claim 1, wherein the first clearance angle is smaller than the third clearance angle.

4. The drill according to claim 1, wherein the first flank surface is flat, and each of the second flank surface and the third flank surface are curved.

5. The drill according to claim 1, wherein a first boundary between the first flank surface and the second flank surface approaches the outer peripheral surface as the first boundary extends from the cutting edge toward a rear side in the rotation direction.

6. The drill according to claim 1, wherein a second boundary between the second flank surface and the third flank surface extends away from the outer peripheral surface as the second boundary extends from the cutting edge toward a rear side in the rotation direction.

7. The drill according to claim 1, wherein, in a front view from a side of the first end, the second flank surface comprises
a first region whose width in a radial direction of the rotation axis decreases as going toward a rear side in the rotation direction, and
a second region whose width in the radial direction increases as going toward a rear side in the rotation direction, the second region being located at a more rear side in the rotation direction than the first region.

8. The drill according to claim 7, wherein a maximum value of a width in the radial direction in the first region is larger than a maximum value of a width in the radial direction in the second region.

9. The drill according to claim 1, wherein the third cutting edge is directly connected to the second cutting edge.

10. The drill according to claim 9, wherein an intersection between the first cutting edge and the second cutting edge is closer to the first end than an intersection between the second cutting edge and the third cutting edge.

11. The drill according to claim 1, wherein a virtual line extending from the second cutting edge forms an acute angle with the rotation axis.

12. A method for manufacturing a machined product, comprising:
rotating the drill according to claim 1;
bringing the drill being rotated into contact with a workpiece; and
moving the drill away from the workpiece.

13. A drill, comprising:
a body extended along a rotation axis from a first end to a second end,
the body comprising
an outer peripheral surface,
a cutting edge located on a side of the first end,
a flank surface located along the cutting edge on a rear side in a rotation direction of the rotation axis, and
a flute extended from the cutting edge toward the second end,
the cutting edge comprising
a first cutting edge,
a second cutting edge extended from the first cutting edge toward the outer peripheral surface, and
a third cutting edge extended from the second cutting edge toward the outer peripheral surface,
the flank surface comprising
a first flank surface which is located along the first cutting edge and has a first clearance angle,
a second flank surface which is located along the second cutting edge and has a second clearance angle, and
a third flank surface which is located along the third cutting edge and has a third clearance angle,
the second clearance angle being smaller than each of the first clearance angle and the third clearance angle, and
the first clearance angle is larger than the third clearance angle.

14. A drill, comprising:
a body extended along a rotation axis from a first end to a second end,
the body comprising
an outer peripheral surface,
a cutting edge located on a side of the first end,
a flank surface located along the cutting edge on a rear side in a rotation direction of the rotation axis, and
a flute extended from the cutting edge toward the second end,
the cutting edge comprising
a first cutting edge, a second cutting edge extended from the first cutting edge toward the outer peripheral surface, and a third cutting edge extended from the second cutting edge toward the outer peripheral surface, the flank surface comprising a first flank surface which is located along the first cutting edge and has a first clearance angle, a second flank surface which is located along the second cutting edge and has a second clearance angle, and a third flank surface which is located along the third cutting edge and has a third clearance angle, the second clearance angle being smaller than each of the first clearance angle and the third clearance angle, and the first flank surface is flat, and the second flank surface and the third flank surface are curved.

* * * * *